ns Patent [19]  [11] 3,956,548
Kovac et al.  [45] May 11, 1976

[54] DUO MATERIAL CARBON COMPOSITE BRAKE DISK

[75] Inventors: James J. Kovac; Mial T. Hillhouse, both of Akron; David M. Seikel, New Philadelphia; Richard L. Ramsey, Akron, all of Ohio

[73] Assignee: Goodyear Aerospace Corporation, Akron, Ohio

[22] Filed: Feb. 27, 1975

[21] Appl. No.: 553,450

Related U.S. Application Data

[63] Continuation-in-part of Ser. No. 426,568, Dec. 20, 1973, abandoned, which is a continuation of Ser. No. 351,258, April 16, 1973, abandoned.

[52] U.S. Cl. ............ 428/64; 156/60; 156/89; 156/155; 188/73.1; 188/251 A; 188/251 R; 192/107 M; 264/29; 428/65; 428/213; 428/215; 428/245; 428/282; 428/408; 428/902
[51] Int. Cl.² .................. B32B 9/00
[58] Field of Search ........... 188/73.1, 251 A, 251 R; 192/107 M; 161/164, 182, 53, 54; 428/245, 282, 411, 902, 913, 408, 36, 64, 65, 213, 215; 156/89, 182, 60, 89, 155; 264/29

[56] References Cited
UNITED STATES PATENTS

| | | |
|---|---|---|
| 2,520,192 | 8/1950 | Bacon .................................. 161/54 |
| 2,717,427 | 9/1955 | Twomey ............................... 161/54 |
| 3,055,789 | 9/1962 | Gemml ................................ 161/182 |
| 3,187,502 | 6/1965 | Stover ................................. 161/182 |
| 3,261,440 | 7/1966 | Graham et al. .................. 188/251 R |
| 3,334,040 | 8/1967 | Conrad et al. ...................... 161/182 |
| 3,576,700 | 4/1971 | Dell ..................................... 161/182 |
| 3,650,357 | 3/1972 | Nelson et al. .................... 188/251 R |
| 3,672,936 | 6/1972 | Ehrenreich ......................... 161/154 |
| 3,712,427 | 1/1973 | Cook et al. ...................... 188/251 A |
| 3,730,320 | 5/1973 | Freeder et al. ................. 188/251 A |

Primary Examiner—William J. Van Balen
Assistant Examiner—Stanley S. Silverman
Attorney, Agent, or Firm—F. W. Brunner; P. E. Milliken; E. W. Oldham

[57] ABSTRACT

The invention resides in a carbonaceous aircraft brake disk having a reuseable lightweight carbon composite center core to which can be bonded lightweight composite wearing materials to each side. The wearing surface is particularly designed for wear loading applications, and is relatively thin thereby simplifying manufacturing and quality assurance steps. The center core is designed for long life and strength at relatively low cost. A carbon felt layer saturated with an adhesive is located between the center core and the lightweight side wear materials to form an integral disk upon pyrolizing of the adhesive.

16 Claims, 1 Drawing Figure

DUO MATERIAL CARBON COMPOSITE BRAKE DISK

CROSS REFERENCE

This patent application is a continuation-in-part of our patent application bearing U.S. Ser. No. 426,568 filed Dec. 20, 1973, now abandoned which in turn was a continuation in part of a patent application bearing Ser. No. 351,258, filed on Apr. 16, 1973 now abandoned.

BACKGROUND OF THE INVENTION

The present invention relates to a carbonaceous aircraft brake disk comprised of a integral, strong, long life center core to which is bonded lightweight long wearing materials on each side.

Due to the complicated nature of fabricating an efficient and homogeneous carbonaceous aircraft brake disk that will function satisfactorily under all braking conditions, heretofore problems in cost and performance have been encountered. This is particularly true with respect to cost when new disks are required to replace the old worn disks and with respect to the production of a low wear disk brake which has suitable strength and a coefficient of friction.

Another problem encountered was that whenever disk brakes were refurbished with new wear plates as in U.S. Pat. No. 3,712,427, to Cook et al, the mechanical engagement effected by rivets would result in pealing, chipping, and cracking in the vicinity of the rivets. This largely was caused about by expansion of the wear plates during a braking operation which caused them to be heated to very high temperatures such as 2000°C and above whereas the inter or core layer due to the often actual existence of an air interface would only be heated to a few hundred degrees centigrade. Additional factors were the actual movement of the rivet within its hole, thereby causing enlargement of the hole and unequal expansion between the rivet and the core layer as well as the side low wear layers. Moreover, refurbishment was largely limited to field operations and thus was costly.

Heretofore in the field of integral brake disks the disks have been made of the same material throughout. However, the amount of time to laminate the various layers was great due to the various coating and baking operation involved and it was not uncommon when such operations were carried out on a daily basis to involve a period of time of from 7 to 9 weeks. Hence, considerable cost is involved in the manufacture of such brake disks.

SUMMARY OF THE INVENTION

Therefore, it is a general object of the present invention to avoid and overcome the foregoing and other objections and deficiencies in the prior art practices by the provisions of a reuseable carbon composite center core to which are bonded lightweight carbon composite wearing material to each side, with the wearing materials specifically designed for long wear loading applications, and with such wearing surfaces being relatively thin to simplify refurbishing, maintain quality assurance and low cost.

A further object of the invention is to provide techniques where the duo carbon material brake disk can utilize a bonded application of the wear surface to the center core.

A further object of the invention is to define a duo carbon material application to carbon brake disks under certain structural limitations to achieve low wear and high strength characteristics.

A still further object of the invention is to provide a brake disk wherein an adhesive bonded carbon felt layer is utilized between the highwear core and the outer low wear disk layer to provide an intregal disk after pyrolizing.

A still further object of the present invention is to provide a carbon composite central core material having high strength characteristics and a carbon composite outer layer having low wear characteristics such that pealing, cracking, or chipping does not occur either on the core or the wear layer.

These and other objects of the present invention will become apparent from the following specification which described in detail various embodiments without attempting to discuss all of the modifications in which the invention might be embodied; the invention being measured by the amended claims and not by the details of the specification.

In general, an integral duo carbon composite brake disk comprises a reusable carbon composite center core, at least one carbon composite low wear layer, a least one carbon felt layer bonded by a high temperature adhesive to said core and said low wear layer to form the brake disk, and said high temperature adhesive pyrolized to form an intregal brake disk.

For a better understanding of the invention reference should be made to the accompanying drawings wherein:

PREFERRED EMBODIMENTS

Figure 1:
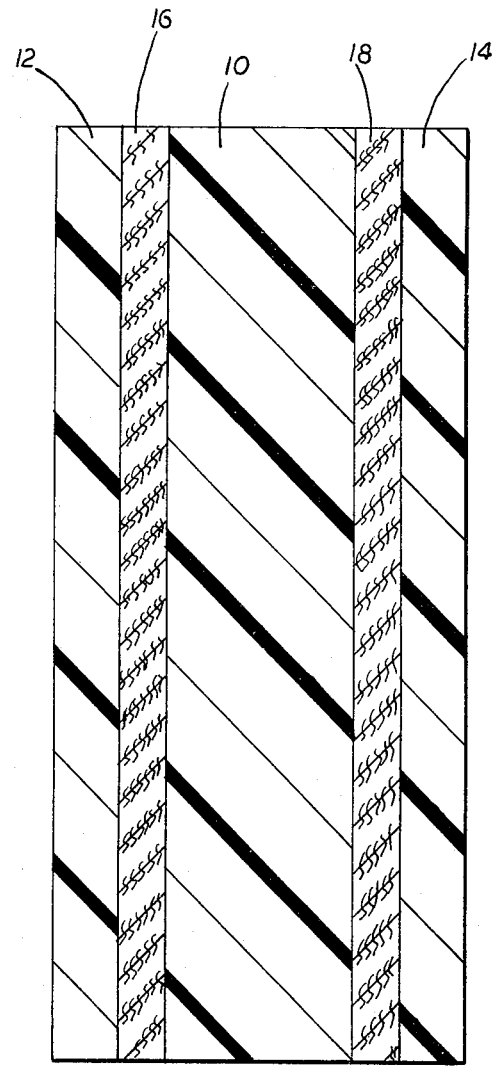
FIG. 1 is an enlarged broken away cross sectional view of one embodiment of the invention.

With reference to the embodiment of the invention illustrated in FIG. 1 of the drawings the numeral 10 indicates a lightweight carbon composite center core which is specifically designed to be reuseable or refurbished as well as for long life, high strength and relatively low cost. The preferred material for core 10 is a carbon base material containing fibers. That is, in the preferred embodiment, the carbon composite core is a laminated structure made from a carbon based material and layers of fiber in accordance with well known conventional practice. Desirably, the carbon base material is coal tar pitch, furan resin, and polyacrylontrile and mixtures thereof and other materials having a high coking value which can be pyrolized to yield essentially a carbon material. By a high coking value is meant a material which upon pyrolization will yield at least 30% of its initial weight as carbon and preferably at least 50%. The fiber layer may be made according to any conventional practice and exists as carbon cloth or a fiber layer containing materials known to the art which may be pyrolized to a carbon cloth. Of course, upon repeated impregnations of the fiber layer by the carbon base material, a core lamination is produced. Of course, the fiber content of the core may vary according to conventional practice and is distinguished from the pyrolized carbon base material, resin material or matrix material which may also vary over a very wide range by weight. Typically, the core should have the following structural characteristics:

| | |
|---|---|
| Bulk Density | at least 1.4 to about 1.9 gms/cc, preferably from 1.7 to about 2.0 gms/cc |
| Flex Strength Perpendicular to Lamina | at least 9,000 psi, 11,300 psi typical |
| Interlaminar Shear Strength | at least 1,000 psi, 1,500 psi typical |
| Compression Strength Perpendicular to Lamina | at least 8,000 psi, 9,500 psi typical |
| Impact Strength Perpendicular to Lamina | from about 10 to about 50 in lbs/in, 28 in. lbs/in typical |

Of course, the typical values may have a considerable range since many different composite core materials having high physical properties can be produced.

The objects of the invention are then achieved by bonding a lightweight carbon composite low wear material in the shape of a thin disk to at least one side thereof and preferably to both sides. The low wear material is generally a laminate and usually can be made according to the preparation of the core layer in any conventional manner with the exception that it preferably has a low wear rate. For example, a low wear layer can be produced by a laminated disk which has a higher density or a lower porosity. These wear faces or layer 12 and 14 are attached to core 10 by bonding layers 16 and 18 respectively. It is anticipated that the wear surfaces 12 and 14 will have a thickness range of from about 0.100 to about 0.150 inches preferred typical thickness of 0.125 inches with the central core 10 having a thickness range of from about 0.350 to about 0.385 inches preferred thickness of approximately 0.375 inches. Of course, greater or lesser thicknesses are contemplated and are within the scope of the invention.

The carbon composite low wear layer materials should have a maximum wear rate of about 0.0004 inches per face per braking stop and a minimum friction coefficient of about 0.10, both at disk loadings of 400,000 ft-lbs/lb. Operating temperatures may range from ambient to about 2800°F. approximately at the outer face surface of the disk facings.

In the present invention the bonding adhesive layers 16 and 18 may typically be a carbon bearing cement such as a graphite cement, a furan resin or a material which upon heating does not degrade, vaporize off, burn up or the like but is largely converted or pyrolized to a carbon material and forms a mechanical bond between the core 10 and wear plates 12 and 14 through the interstiles in the core and wear plates. More specifically, the pyrolized cement or adhesive agent must be capable of forming a carbon material. Such a high temperature adhesive thus preferably contains a high amount of carbon bearing compound such as a furan resin, petroleum pitch or coal tar pitch and mixtures thereof since they can be pyrolized to essentially form a carbon material. If furan resin is utilized, it may be cured with a catalyst well known to one skilled in the art such as maleic anhydride.

In general, the cement or resin is applied between the wear plates 12 and 14 and the core 10 and preferably in association with at least one carbon felt layer. That is, it has been found that in order to provide a good or excellent bond during braking operations and through the extreme temperatures encountered during braking, the utilization of cement or resin by itself is not sufficient to produce a suitable integral brake disk. However, excellent surface mating between the core and the wear plates is obtained by utilizing at least one layer 22 of the felted material which is saturated with the above described high carbon content cement or resin and then bakes and pyrolized under pressure as set forth below to form an integral brake disk. That is, both the cement or resin and the felt layer will be essentially converted to a high carbon material as is the central core 10 and the wear plate layers 12 and 14 so that an integral laminated disk brake is formed. Generally, from 1 to 3 felt layers is utilized and preferably placed on top of one another (not shown). A single layer as shown, however, is preferred.

An important aspect of the present invention is that layer 22 be a carbon felt layer. Thus, conventional carbon cloth layers and the like are not suitable and have been found not to produce a good bond. The felt material may generally be made of the same type of compound as a cloth layer and thus the carbon felt may be made from rayon, conventional polyacrylonitrile, furan resins, coal tar pitch precursors, mixtures thereof, and the like. The carbon felt layers once saturated with cement or resins as set forth above and compressed under pressure and pyrolized have been found to form a good mechanical bond with the core and the wear plates and thus produce an integral and essentially carbon disk brake having a strong structural core and a low wear lateral portions.

The disk is the assembled and baked. The initial bake may generally range from about 200° to about 500°F either in an oven or under pressure in a press (approximately from 200 to about 2,000 pounds per square inch) for a period of time of at least 1 hour to about 3 hours to cure the adhesive. A second high bake is usually required to pyrolize the adhesive and felt layer into carbon so that it can withstand the extremely high temperatures encountered during a braking operation, This bake can be from about 2,000° to about 3,000°F for approximately one or two hours depending upon the adhesive or cement. Of course, other baking cycles or cures can be utilized pyrolize the resin or cement and form an integral bond.

Thus, the embodiment shown in FIG. 1 made according to the above procedure has a strong structural carbon composite core with frictional wear plates 12 and 14 that can be replaced. That is, upon were of the wear layers 12 and 14, the low wear disk brake is reduced to essentially the central core as by cutting or grinding the remaining portion of the low wear layers in typically a factory operation. Then, a resin saturated carbon felt layer is applied to the core and a new low wear layer applied to the felt layer. Then the disk brake is pyrolized to once again form an integral laminated structure containing two types of material. This process can be repeated for a number of times until the high structural core layer is deemed to have served a useful life. Since conventional laminated disk brakes often take on the average from 7 to 9 weeks to produce, the utilization of the bonded integral structure as set forth here greatly reduces the total fabrication time to about one week and hence the cost.

The invention contemplates that the structure shown in FIG. 1 would normally be made up as a circular structure with notches formed on either the inner diameter or outer diameter dependent on rotor or stator usage for driving and/or torque resisting purposes as used in a normal disk brake application. The invention further contemplates that the wear plates may have slightly changed wearing characteristics dependent upon each wear loading application. Since, however, the wear plates are relatively thin, it simplifies their manufacture and quality assurance. Further, the major torque transfer is clearly through the structural core material.

Hence, it will be seen that the objects of the invention have been achieved by providing a structural carbon carrier and a frictional carbon wear plate with particular characteristics associated with each so that the desired function is performed.

While in accordance with the patent statutes, the preferred embodiments of the invention have been illustrated and described, it is to be particularly understood that the invention is not limited thereto or thereby, but that the invention scope is defined in the appended claims.

What is claimed is:

1. An integral duo carbon composite brake, disk comprising, a reusable carbon composite core, said composite core containing a laminate of a carbon cloth fiber and a high coking value material pyrolized to yield essentially a carbon material, at least one carbon composite low wear layer, said low wear layer containing a laminate of a carbon cloth fiber and a high coking value material pyrolized to yield essentially a carbon material, at least one carbon felt layer bonded by a high carbon bearing cement to said core and said low wear layer to form the brake disk, and, said carbon cement pyrolized to form a carbon material so that an integral duo brake disk is formed.

2. An integral duo carbon composite brake disk according to claim 1, wherein said pyrolized material of said carbon composite core is selected from the class consisting of coal tar pitch, furan resin, polyacrylonitrile, and mixtures thereof.

3. An integral duo carbon composite brake disk according to claim 12, wherein said pyrolized material of said low wear layer is selected from the calss consisting of coal tar pitch, furan resin, polyacrylonitrile, and mixtures thereof.

4. An integral duo carbon composite brake disk according to claim 3, wherein said carbon felt layer is made from pyrolized material selected from the class consisting of rayon, polyacrylonitrile, furan resins, coal tar pitch precursors, and mixtures thereof, said high carbon bearing cement selected from the class consisting of furan resins, petroleum pitch, coal tar pitch, and mixtures thereof.

5. An integral brake disk according to claim 3, wherein one low wear layer exists on each side of said core.

6. An integral carbon brake disk according to claim 5, wherein said core has a thickness of from about 0.350 to about 0.385 inches and said wear plate has a thickness of from about 0.100 to about 0.150 inches.

7. An integral carbon brake disk according to claim 3, containing from one to three felt layers.

8. An integral duo carbon composite brake disk, according to claim 7, wherein said low wear layer has a high density or a low porosity.

9. An integral carbon brake disk according to claim 3, wherein one said carbon felt layer exists between said core and each low wear layer.

10. An integral carbon brake disk according to claim 7, wherein said core has a bulk density of at least 1.4 grams per cc, wherein said core has a bulk density of at least 1.4 grams per cc, a flex strength perpendicular to the lamina of at least 9,000 psi, and interlaminar shear strength of at least 1,000 psi, a compressive strength perpendicular to the lamina of at least 8,000 psi and an impact strength perpendicular to the laminar of at least 10 inch lbs./in.

11. An integral carbon brake disk, according to claim 7, wherein said wear material has a maximum wear rate of 0.0004 inches per face per 100 percent energy braking stop.

12. An integral carbon disk brake according to claim 7, wherein said cement layer is baked at high temperatures to pyrolize said cement.

13. An integral carbon disk brake according to claim 12, wherein said high baked temperature ranges from about 2000° to about 3000°F.

14. A process for producing integral duo carbon composite brake disk, comprising the steps of, fabricating a reusable carbon composite core, said carbon composite core containing a laminate of a carbon cloth fiber and a pyrolized material selected from the class consisting of coal tar pitch, furan resin, polyacrylonitrile, and mixtures thereof, fabricating a carbon composite low wear layer, said low wear layer containing a laminate of a carbon cloth and a pyrolized material selected from the class consisting of coal tar pitch, furan resin, polyacrylonitrile, and mixtures thereof, fabricating a carbon felt layer, said carbon felt layer made from pyrolized materials selected from the class consisting of rayon, polyacrylonitrile, furan resins, coal tar pitch precursors, and mixtures thereof, saturating said felt layer with a high carbon bearing cement bonding said core to said wear layer through said saturated felt layer to form the brake disk, said high carbon bearing cement selected from the class consisting of furan, petroleum pitch, coal tar pitch, and mixtures thereof, and baking said brake disk at a high temperature to pyrolize said cement to form an integral brake disk.

15. A method according to claim 14, including the baking of said brake disk at a temperature of from about 2000° to about 3000°F.

16. A method according to claim 15, wherein said brake disk is baked under a compression of from 200 to 2,000 psi.

* * * * *